United States Patent
Le Gendre et al.

(10) Patent No.: US 7,099,657 B2
(45) Date of Patent: Aug. 29, 2006

(54) METHOD OF OBTAINING INFORMATION ON THE IDENTITY OF A CALLER IN A TERMINAL OF A TELEPHONE COMMUNICATIONS NETWORK

(75) Inventors: Yves Le Gendre, Puiseux en France (FR); Alain Guirauton, Argenteuil (FR)

(73) Assignee: Alcatel, Paris (FR)

( * ) Notice: Subject to any disclaimer, the term of this patent is extended or adjusted under 35 U.S.C. 154(b) by 860 days.

(21) Appl. No.: 09/739,305

(22) Filed: Dec. 19, 2000

(65) Prior Publication Data
US 2001/0005842 A1    Jun. 28, 2001

(30) Foreign Application Priority Data
Dec. 23, 1999   (FR) .................................. 99 16338

(51) Int. Cl.
   *H04Q 7/20*    (2006.01)
   *H04M 3/42*    (2006.01)
(52) U.S. Cl. ................. 455/415; 455/414.1; 379/88.19
(58) Field of Classification Search ................ 455/415, 455/414.1, 567; 379/142.04, 142.06, 88.19, 379/88.2, 88.21
See application file for complete search history.

(56) References Cited

U.S. PATENT DOCUMENTS

| | | | |
|---|---|---|---|
| 5,546,447 A * | 8/1996 | Skarbo et al. ......... | 379/142.05 |
| 5,557,605 A * | 9/1996 | Grube et al. ................. | 455/415 |
| 5,606,693 A | 2/1997 | Nilsen et al. | |
| 5,740,423 A | 4/1998 | Logan et al. | |
| 5,842,009 A | 11/1998 | Borowoy et al. | |
| 5,940,484 A * | 8/1999 | DeFazio et al. ....... | 379/142.06 |
| 5,982,867 A | 11/1999 | Urban et al. | |
| 6,275,576 B1 * | 8/2001 | Urban et al. ........... | 379/207.02 |
| 6,597,772 B1 * | 7/2003 | Fleming, III ............. | 379/93.25 |
| 6,697,484 B1 * | 2/2004 | Fleming, III ................ | 379/354 |

FOREIGN PATENT DOCUMENTS

WO    WO 99/21171    4/1999

* cited by examiner

*Primary Examiner*—Erika A. Gary
(74) *Attorney, Agent, or Firm*—Sughrue Mion, PLLC

(57) ABSTRACT

The invention relates to identifying callers in a terminal of a telephone communications network in which the caller's number is transmitted by the network at the time of an incoming call. The invention proposes providing the terminal with an agent which, on or after receiving a caller's number, selects at least one external server likely to be able to provide identity information; the agent then uses a request file and the caller's number to prepare a request whose argument is the caller's number and whose destination is the server. The request is sent to the server to obtain the information. In the absence of a result, the agent can send a plurality of requests in succession.

14 Claims, 1 Drawing Sheet

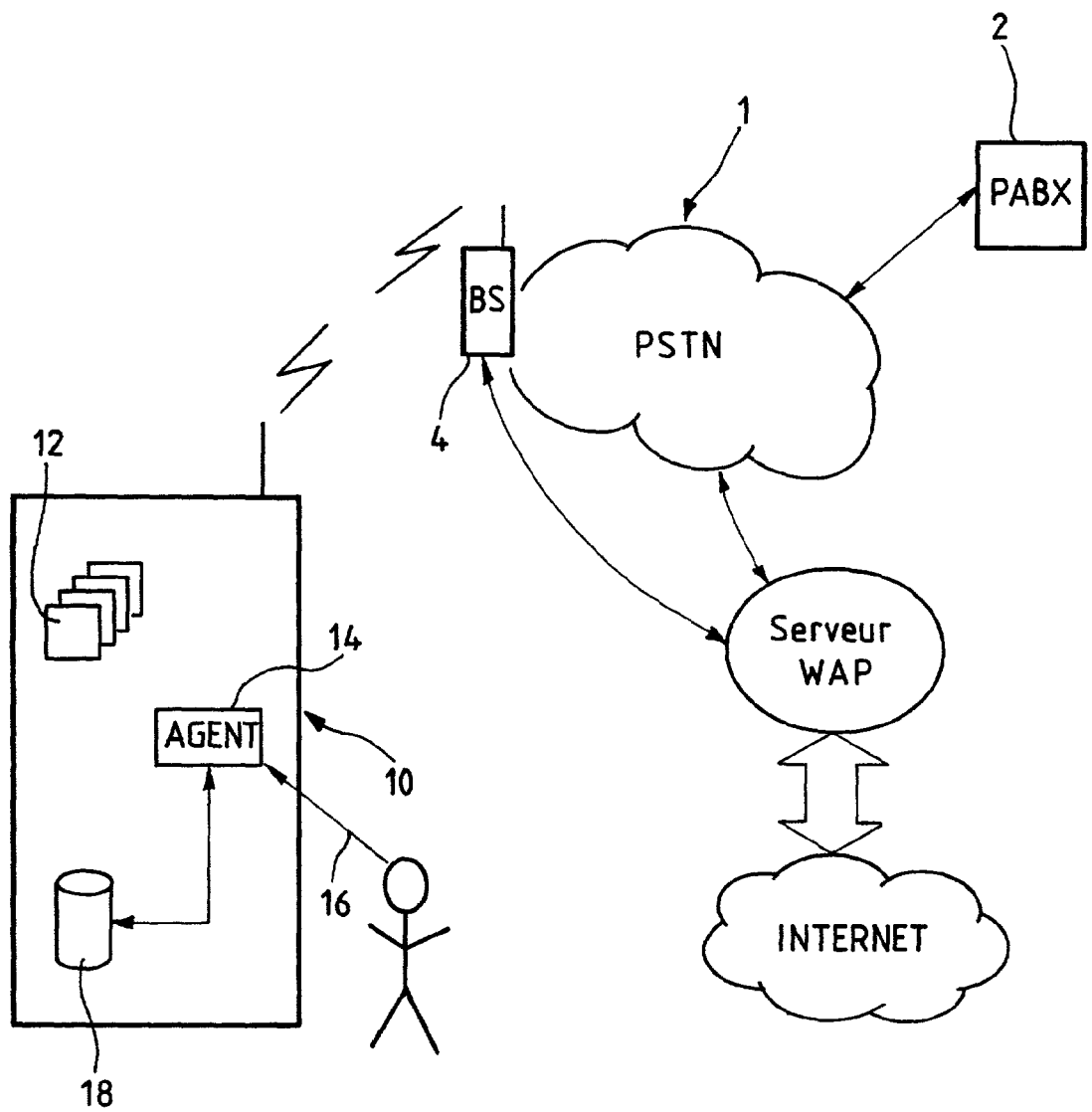

METHOD OF OBTAINING INFORMATION ON THE IDENTITY OF A CALLER IN A TERMINAL OF A TELEPHONE COMMUNICATIONS NETWORK

The present invention relates to telephone communication terminals and more precisely to displaying the identity of the caller for incoming calls.

BACKGROUND OF THE INVENTION

Many carriers providing various types of telephone communications network (public switched network, terrestrial or non-terrestrial public mobile network, etc.) offer the option of transmitting the telephone number of the caller with incoming calls. The number can be displayed on a screen of a terminal receiving the call or stored in a memory of the terminal. The problem addressed by the invention is that of associating a telephone number with information relating to the caller. The telephone number is not a straightforward identifier and it can be difficult for the terminal user to identify the caller only from their telephone number.

Various solutions to this problem have already been proposed. A first solution applies to terminals which store a directory of names with associated telephone numbers, in which case, when a caller's number is received, it is compared to all of the telephone numbers stored in the directory; if the caller's number as received coincides with a number stored in the directory, then the name corresponding to the number stored in the directory is displayed on the screen; in some terminals the display of the name of the caller replaces the number, while in others the name is displayed in addition to the number. That solution is employed in some of the mobile terminals currently available. It is limited to the directory or directories of the terminal and cannot provide the name of a caller who is not listed in the directory or directories of the terminal.

In the case of private networks (for example a PABX), the name of the caller can be transmitted and displayed if the caller is also on the private network. The service is not provided in the case of an outside caller who is not listed in the database of the private system.

U.S. Pat. No. 5,077,788 proposes another solution to the problem, dedicated to calls to the emergency services, obtained in the USA by dialing 911. It proposes to transmit such calls to a response station. The response station has a memory containing information relating to callers and information relating to emergency services. On receiving a call, the response station retrieves information relating to the caller from the memory, using the caller's number, and transmits the information to the appropriate emergency service agency. That solution is satisfactory only if information relating to the name of the caller is actually stored in the memory of the response station, and from this point of view that solution is entirely similar to the directory solution referred to above.

U.S. Pat. No. 5,341,414 describes various systems available in the United States and in particular the interstate automatic number identification (ANI) system which provides information relating to the caller from a single database, so that solution is limited by the content of that single database. WO-A-97/33418 describes an improvement to the ANI system intended to provide other types of information, but still based on a single database. The drawbacks are the same.

Finally, there are various services for providing a name from a telephone number. The French Minitel service, accessed by dialing 3617 and entering the code "ANNU", obtains the details of a subscriber from their telephone number. The Internet site annu.web provides the same service.

OBJECTS AND SUMMARY OF THE INVENTION

The invention proposes a solution to the problem stated above, namely that of identifying callers from their telephone numbers. The solution in accordance with the invention identifies a caller independently of any given server.

To be more precise, the invention proposes a method of obtaining information on the identity of a caller in a terminal of a telephone communications network, the method comprising:
  the terminal receiving an incoming call and the caller's number;
  an agent of the terminal selecting at least one external server likely to be able to provide said information;
  the agent preparing a request whose argument is the telephone number and whose destination is the server; and
  the agent sending the request to the server.

An implementation of the method further comprises:
  the agent receiving the response from the server; or
  if there is no response, or if the response is not satisfactory, the agent selecting another server, preparing another request, and sending the other request to the other server.

The steps of receiving the response or selecting another server, preparing another request, and sending the other request to the other server can be repeated if there is no response or if the response is not satisfactory.

The selection step is advantageously effected by searching a request file.

In an implementation of the method, the terminal is a terminal having a data channel and a request is sent on the data channel.

The terminal can also be a mobile terminal.

The invention also provides a terminal of a telephone communications network in which the caller's number is transmitted at the time of an incoming call, wherein the terminal has an agent having instructions for:
  selecting at least one external server likely to be able to provide said information;
  preparing a request whose argument is the telephone number and whose destination is the server; and
  sending the request to the server.

The agent advantageously also has instructions for:
  receiving the response from the server; or
  if there is no response, or if the response is not satisfactory, selecting another server, preparing another request, and sending the other request to the other server.

The agent preferably repeats the steps of receiving the response or selecting another server, preparing another request, and sending the other request to the other server if there is no response or if the response is not satisfactory.

The terminal can include a request file which is accessed by the agent to select a server and prepare a request.

In an embodiment, the terminal has a data channel and a request is sent on the data channel.

In another embodiment, the terminal is a mobile terminal.

In a further embodiment, the terminal is a fixed terminal connected to the telephone network.

In a final embodiment, the terminal is a fixed terminal having access to the Internet.

BRIEF DESCRIPTION OF THE DRAWING

Other features and advantages of the invention will become apparent on reading the following description of embodiments of the invention, which description is given by way of example and with reference to the accompanying drawing, in which the single FIGURE is a diagram showing a communication system using the invention.

MORE DETAILED DESCRIPTION

In the remainder of the description, the invention is described in the particular situation in which the information identifying a caller is the caller's name; the invention also applies independently of the nature of the identification information, which could (depending on the application) be the caller's company or location or any other pertinent identification information. The invention is also described with reference to the example of a terminal which is a mobile station of a public mobile network; the invention also applies to terminals of other types.

To obtain information identifying the caller, the invention proposes not to access a dedicated server but instead to begin by determining a server likely to be able to provide the required information, as a preliminary step before retrieving the information. The invention therefore enables information to be obtained without being restricted to the information available from a dedicated source.

The single FIGURE is a diagram showing a communications system using the invention; the FIGURE shows the public switched telephone network (PSTN) 1 which is connected to a private automatic branch exchange (PABX) 2 of a private network. The PSTN is connected, in a manner that is known in the art, to a radio interface 4 (typically a base transceiver station) for transmission via a public mobile network. The FIGURE also shows a wireless application protocol (WAP) server 6. The wireless application protocol enables data services, and in particular internet services, to be offered on terminals of public mobile networks. The WAP server is connected to the radio interface 4, to the PSTN 1 and to the Internet and/or an intranet 8.

The FIGURE also shows a terminal 10, which in this example is a mobile station of a mobile public network. In the event of an incoming call, the terminal receives the caller's number from the mobile network.

The terminal 10 has a directory 12 which can be used to implement the first solution mentioned above, namely searching for a directory entry in which the telephone number is identical to the caller's number.

According to the invention, the terminal also has an agent 14 (i.e. a program or an application) which prepares one or more requests whose argument is the caller's number and whose objective is to identify the caller. The agent can be activated automatically or by the user, as symbolized by the arrow 16 in the FIGURE. The agent can be activated on receiving the caller's number, or if checking the directory shows that there is no directory entry with the same telephone number, or after the end of the incoming call for which the caller's number was transmitted. The agent can also be activated each time that a caller's number is shown on the user's terminal.

The argument of a request prepared by the agent is the caller's number received with the incoming call. The object of the request is to obtain identification information on the basis of the caller's number. The request can be addressed to any source of identification information. The simplest option is to send a request to a data server; a request can also be sent to a search engine or a WAP portal. In this case, the search engine, WAP portal or server can itself carry out the search and return the required response to the terminal in the required format.

The request prepared by the agent can be sent on any channel available to the terminal, preferably the most efficient channel with the lowest cost. In the case of a mobile station of a mobile network, the request could be sent via a data channel in connectionless packet mode, and for example via the GSM packet radio system (GPRS) in the case of a GSM terminal. The request could also be transmitted on a data channel in connected packet mode. For fixed terminals, a voice channel could be used with dual tone multi-frequency (DTMF) coding or a low-speed modem. For a mobile terminal using the wireless application protocol, a request can be transmitted in accordance with that protocol. In the case of several successive requests, different channels can be used, as indicated below.

The response to the requests can be returned to the terminal via the same channel; the terminal can instead transmit the request and receive the information on different channels.

The requests can be prepared by the agent on the basis of a request file 18. The file can contain all possible requests; it is advantageously updated, for example by the user; the requests can also be updated by a remote server, or the user can downloaded requests. The agent can select requests according to the caller's number; for example, some requests can be dedicated to numbers of a particular type, such as national numbers of a given state, or numbers of a given carrier.

The agent can send several requests in succession to obtain the required identification information. The order of the various requests can be predetermined or depend on the results of attempts to identify previous numbers. The order of the requests can also depend on the nature of the caller's number, for example the geographical origin, or any other category that can be recognized from the telephone number itself.

The agent receives the result of the request. How the result is processed depends on its nature. If the result corresponds to the required identification (for example if the request returns a user name) the agent can display the information obtained or store it in the directory, with or without validation by the terminal user. If the result does not correspond to the required identification information (for example if the request returns an error message or an indication that the information is not available) the agent can ignore the result and trigger the next request.

Thus the invention enables users to obtain identification information for a caller's number transmitted to them. This has the advantage over prior art solutions of enabling a more comprehensive search and a greater probability of a successful response.

Of course, the invention is not limited to the embodiments described. As described above, the invention applies to public network mobile terminals. It can also apply to other types of terminal, for example private network mobile terminals or fixed terminals. An agent can be downloaded to update the request file and the agent itself.

The invention claimed is:

1. A method of obtaining information regarding an identity of a caller in a terminal of a telephone communications network, wherein the terminal comprises an agent including a program or an application which is stored and activated on the terminal, the method comprising:
- receiving at the terminal an incoming call from a caller and a telephone number of the caller;
- at the agent of the terminal, selecting from among a plurality of external servers at least one external server likely to be able to provide the information regarding the identity of the caller;
- preparing at the agent of the terminal a request indicating the telephone number of the caller and requesting the information regarding the identity of the caller; and
- sending from the agent of the terminal the request to the server.

2. The method of claim 1, further comprising:
- receiving at the agent of the terminal a response to the request from the server; or
- if a response to the request is not received at the agent, or if the response is not satisfactory, selecting at the agent another server likely to be able to provide said information on the identity of the caller, preparing at the agent another request indicating the telephone number of the caller and requesting the information regarding the identity of the caller, and sending from the agent the other request to the other server.

3. The method of claim 2, wherein the steps of receiving the response or selecting another server, preparing another request, and sending the other request to the other server are repeated if the response to the other request is not received at the agent or if the response to the other request is not satisfactory.

4. The method of claim 1, wherein the step of selecting at the agent at least one external server likely to be able to provide said information on the identity of the caller is performed by searching a request file.

5. The method of claim 1, wherein the terminal has a data channel and wherein the request is sent on the data channel.

6. The method of claim 1, wherein the terminal is a mobile terminal.

7. A terminal of a telephone communications network in which a telephone number of a caller is transmitted to the terminal at the time of an incoming call to the terminal, the terminal comprising an agent for configured to select from among a plurality of external servers at least one external server likely to be able to provide information regarding an identity of a caller, prepare a request indicating the telephone number of the caller and requesting the information regarding the identity of the caller, and send the request from the terminal to the server, wherein the agent comprises a program or an application which is stored and activated on the terminal.

8. The terminal of claim 7, wherein the agent is configured to receive a response to the request from the server, and if there is the response is not received, or if the response is not satisfactory, select another server likely to be able to provide said information on the identity of the caller, prepare another request indicating the telephone number of the caller and requesting the information regarding the identity of the caller, and send the other request to the other server.

9. The terminal of claim 8, wherein the agent is configured to select another server, prepare an additional request, and sending the additional request to the other server if there is no response to the other request or if the response to the other request is not satisfactory.

10. The terminal of claim 7, wherein the agent is configured to access a request file to select the server and prepare the request.

11. The terminal according to claim 7, wherein the terminal has a data channel and wherein the request is sent on the data channel.

12. The terminal according to claim 7, wherein the terminal is a mobile terminal.

13. The terminal of claim 7, wherein the terminal is a fixed terminal connected to the telephone network.

14. The terminal of claim 7, wherein the terminal is a fixed terminal having access to the Internet.

* * * * *